United States Patent
Hasegawa

(10) Patent No.: US 9,769,856 B2
(45) Date of Patent: Sep. 19, 2017

(54) COMMUNICATION COMMUNICATION SYSTEM, TERMINAL, COMMUNICATION CONTROL APPARATUS, METHOD AND PROGRAM

(71) Applicant: NEC Corporation, Tokyo (JP)

(72) Inventor: Yohei Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 14/771,156

(22) PCT Filed: Feb. 27, 2014

(86) PCT No.: PCT/JP2014/054833
§ 371 (c)(1),
(2) Date: Aug. 27, 2015

(87) PCT Pub. No.: WO2014/133066
PCT Pub. Date: Sep. 4, 2014

(65) Prior Publication Data
US 2016/0014829 A1  Jan. 14, 2016

(30) Foreign Application Priority Data

Feb. 28, 2013  (JP) .................... 2013-039257

(51) Int. Cl.
*H04W 4/00* (2009.01)
*H04W 76/02* (2009.01)
(Continued)

(52) U.S. Cl.
CPC .......... *H04W 76/022* (2013.01); *H04L 12/12* (2013.01); *H04L 29/06* (2013.01); *H04L 43/0829* (2013.01)

(58) Field of Classification Search
CPC ...... H04W 76/022; H04L 12/12; H04L 29/06; H04L 43/0829
(Continued)

(56) References Cited

U.S. PATENT DOCUMENTS 7,613,143 B2   11/2009  Kakishima et al.
8,416,940 B2 *  4/2013  Ogawa ................... H04L 65/80
                                               370/235
(Continued)

FOREIGN PATENT DOCUMENTS

JP   H 10-215280 A   8/1998
JP   2004-320702 A   11/2004
(Continued)

OTHER PUBLICATIONS

International Search Report (ISR) (PCT Form PCT/ISA/210), in PCT/JP2014/054833, dated Mar. 25, 2014.
(Continued)

*Primary Examiner* — Faisal Choudhury
(74) *Attorney, Agent, or Firm* — McGinn IP Law Group, PLLC

(57) ABSTRACT

A communication system includes a communication control apparatus that establishes a communication path between terminals and notifies at least one of the terminals of information about the established communication path. The terminal that has received the notification from the communication control apparatus establishes a communication protocol to be used for communication between the terminals on the basis of the information from the communication control apparatus.

7 Claims, 7 Drawing Sheets

(51) Int. Cl.
*H04L 29/06* (2006.01)
*H04L 12/12* (2006.01)
*H04L 12/26* (2006.01)

(58) Field of Classification Search
USPC .......................................................... 370/329
See application file for complete search history.

(56) References Cited

U.S. PATENT DOCUMENTS

| | | | |
|---|---|---|---|
| 2004/0192221 A1* | 9/2004 | Matsunaga | H04W 36/30 455/76 |
| 2004/0252696 A1 | 12/2004 | Kakishima et al. | |
| 2006/0025122 A1* | 2/2006 | Harris | H04W 4/16 455/419 |
| 2006/0039287 A1* | 2/2006 | Hasegawa | H04L 69/163 370/238 |
| 2010/0046470 A1* | 2/2010 | Sekiya | H04B 1/7083 370/331 |
| 2010/0046511 A1* | 2/2010 | Khalid | H04L 67/141 370/389 |
| 2012/0020222 A1 | 1/2012 | Nishioka | |
| 2012/0201203 A1* | 8/2012 | Miyagawa | H04L 63/30 370/328 |
| 2013/0064198 A1* | 3/2013 | Krishnaswamy | H04W 76/025 370/329 |
| 2013/0235782 A1* | 9/2013 | Wentink | H04W 76/06 370/312 |

FOREIGN PATENT DOCUMENTS

| | | |
|---|---|---|
| JP | 2008-092053 A | 4/2008 |
| JP | 2008-518531 A | 5/2008 |
| WO | WO 2010/119627 A1 | 10/2010 |

OTHER PUBLICATIONS

Nick McKeown, et al. "OpenFlow: Enabling Innovation in Campus Networks," [online], [Searched on Aug. 7, 2012], the Internet <URL: http://www.openflow.org/documents/openflow-wp-latest.pdf>.

"OpenFlow Switch Specification" Version 1.1.0. Implemented (Wire Protocol 0x02), [online], [Searched on Aug. 7, 2012], the Internet <URL:http://www.openflow.org/documents/openflow-spec-v.1.1.0.pdf>.

* cited by examiner

FIG. 6

| ITEM | BIT NUMBER | CONTENTS |
|---|---|---|
| RECOMMENDED CONGESTION CONTROL ALGORITHM | 8 BITS | SPECIFY CONGESTION CONTROL ALGORITHM USED FOR COMMUNICATION |
| RECOMMENDED RETRANSMISSION CONTROL ALGORITHM | 8 BITS | SPECIFY RETRANSMISSION CONTROL ALGORITHM USED FOR COMMUNICATION |
| RECOMMENDED RETRANSMISSION CONTROL OPTION | 8 BITS | SPECIFY RETRANSMISSION CONTROL OPTION |
| RECOMMENDED WINDOW SIZE | 16 BITS | SPECIFY RECOMMENDED VALUE OF WINDOW SIZE |
| REQUESTED LINE BANDWIDTH | 32 BITS | SPECIFY DESIRED BANDWIDTH TO BE USED |
| TRANSFER DATA SIZE | 64 BITS | SPECIFY DATA SIZE FOR COMMUNICATION | cation using an optical signal, has made progress. In optical space communication, it is possible to arrange wireless links with ultra-high density since optical beams do not interfere with each other as long as narrow optical beams are used. The utilization of such a high-speed wireless link is expected to provide a link that can be easily set up in a large-scale network.

COMMUNICATION COMMUNICATION SYSTEM, TERMINAL, COMMUNICATION CONTROL APPARATUS, METHOD AND PROGRAM

REFERENCE TO RELATED APPLICATION

This application is based upon and claims the benefit of the priority of Japanese Patent Application No. 2013-039257 filed on Feb. 28, 2013, the disclosure of which is incorporated herein in its entirety by reference thereto.

The present invention relates to a communication system, terminal, communication control apparatus, communication method, and program, and particularly to a communication system, terminal, communication control apparatus, communication method, and program including a communication control apparatus that establishes a communication path between terminals.

BACKGROUND

In a large-scale network, the cost of laying cables becomes an issue; for instance, there is an example of a supercomputer using cables as long as 1,000 km. When cables are installed with such high density, it becomes difficult to move the wring of the cable, reconnect cable terminals, or exchange cables.

Therefore, as an alternative to the cable, wireless communication in which connection changes can easily performed may be utilized. For instance, a wireless link using conventional and general radio waves such as the 2.4 GHz band can be utilized. Furthermore, as a high-speed wireless technology that can be used in high density, the study of optical space communication, which is wireless communication using an optical signal, has made progress. In optical space communication, it is possible to arrange wireless links with ultra-high density since optical beams do not interfere with each other as long as narrow optical beams are used. The utilization of such a high-speed wireless link is expected to provide a link that can be easily set up in a large-scale network.

Patent Literature 1 discloses a communication protocol selection apparatus and method for a router for forwarding a packet that prevent packet loss and communication failure in a network and enable the construction of a highly reliable communication system. More concretely, Patent Literature 1 describes a configuration in which storage means for storing the communication protocol type of an access router that corresponds to a user address is provided, protocol request means for giving the user address of a destination user to a first access router and for transmitting a protocol request signal that requests the communication protocol type of a second access router accommodating the destination user is provided, and protocol management means for reading the storage means when the protocol request signal is received and for returning the communication protocol type of an access router that corresponds to a user address transmitted by the protocol request means is provided.

Patent Literature 2 discloses a network controlling system enabling common network management when a plurality of wireless systems are accommodated by a common network. The document states that a node provided on the network comprises transmitting/receiving means that transmits and receives a control signal defined by each of the wireless systems, protocol converting means that converts the control signal to a common protocol independent of each of the wireless systems, and entity communication controlling means that communicates with a functional entity implementing network control, using the converted common protocol.

Non-Patent Literatures 1 and 2 propose a centralized control type communication system called OpenFlow. OpenFlow treats communication as an end-to-end flow and performs path control, failure recovery, load balancing, and optimization for each flow.

PATENT LITERATURE

[Patent Literature 1]
Japanese Patent Kokai Publication No. JP-H10-215280A
[Patent Literature 2]
Japanese Patent Kokai Publication No. JP2004-320702A

NON PATENT LITERATURE

[Non-Patent Literature 1]
Nick McKeown, et al. "OpenFlow: Enabling Innovation in Campus Networks," [online], [Searched on Aug. 7, 2012], the Internet <URL: http://www.openflow.org/documents/openflow-wp-latest.pdf>
[Non-Patent Literature 2]
"OpenFlow Switch Specification" Version 1.1.0. Implemented (Wire Protocol 0x02)," [online], [Searched on Aug. 7, 2012], the Internet <URL:http://www.openflow.org/documents/openflow-spec-v1.1.0.pdf>

SUMMARY

The following analysis is given by the present invention. When a wireless link is used as an alternative to a wired link in a network, there are the following problems. First, a wireless link using conventional and general radio waves such as the 2.4 GHz band has issues of radio wave interference and jamming, and the available number of radio communication lines is limited. Optical space communication does not tend to have the 2.4 GHz band issues, but an optical beam can be easily cut off by an obstacle in the air. Further, when a sufficiently narrow beam is used, the optical axis may get shifted by an external vibration. A signal error may occur in wireless communication that includes optical space communication, and phenomena unimaginable with a wired link such as an optical axis deviation may occur, causing a long term signal loss.

As described, it is difficult to obtain the same communication performance as a wired link from a wireless link, and particularly the performance of TCP/IP (Transmission Control Protocol/Internet Protocol), a widely used data communication system, is expected to be reduced. For instance, a data transmitter in TCP retransmits data when a receiver does not reply an acknowledgement (ACK) of the receipt of data for a time period longer than the set value (normally one second) of a retransmission timer and the retransmission timer is activated, and this greatly slows down the transmission speed. Further, when the retransmission timer is activated, the set time of the retransmission timer is doubled. As a result, an increase in the signal loss time will exponentially prolong the retransmission interval, greatly extending the time until forwarding is resumed.

It is an object of the present invention to provide a communication system, terminal, communication control apparatus, communication method, and program that eliminate a mismatch between a communication protocol that performs retransmission control such as TCP described above and a communication path to achieve efficient communication in a case where a wireless link is included in the communication path.

According to a first aspect, there is provided a communication system comprising: a communication control apparatus that establishes a communication path between terminals and notifies at least one of the terminals of information about the established communication path, and the terminal that has received the notification from the communication control apparatus establishes a communication protocol to be used for communication between the terminals on the basis of the information from the communication control apparatus.

According to a second aspect, there is provided a terminal connected to a communication control apparatus that establishes a communication path between the terminals and notifies at least one of the terminals of information about the established communication path, and the terminal establishes a communication protocol to be used for communication with a communication partner terminal on the basis of the information notified by the communication control apparatus.

According to a third aspect, there is provided a communication control apparatus comprising a communication path notification unit that establishes a communication path between terminals and notifies at least one of the terminals of information about the established communication path, and instructing any of the terminals to establish a communication protocol to be used for communication between the terminals.

According to a fourth aspect, there is provided a communication method comprising: establishing a communication path between terminals and notifying at least one of the terminals of information about the established communication path, and a step of having the terminal that has received the notification establish a communication protocol to be used for communication between the terminals on the basis of information from the communication control apparatus. The present method is tied to particular machines, which are the communication control apparatus that establishes a communication path between the terminals, and the terminals According to a fifth aspect, there is provided a program having a computer provided in a terminal connected to a communication control apparatus that establishes a communication path between the terminals and notifies at least one of the terminals of information about the established communication path execute a process of receiving the information from the communication control apparatus, and a process of establishing a communication protocol to be used for communication with a communication partner terminal on the basis of the information notified by the communication control apparatus. Further, this program can be stored in a computer-readable (non-transient) storage medium. In other words, the present invention can be realized as a computer program product.

The meritorious effects of the present invention are summarized as follows. According to the present invention, a mismatch between a communication path and a communication protocol can be eliminated and efficient communication is possible. That means that the present invention transforms the prior art structure into a communication system which have a function to select suitable communication protocol corresponding to a communication path and improves the efficiency of the communication.

BRIEF DESCRIPTION OF THE DRAWINGS

FIG. 6 is a drawing showing an example of information stored in an option area of a TCP/IP header by the terminal of the first exemplary embodiment of the present disclosure.

PREFERRED MODES

Figure 1:
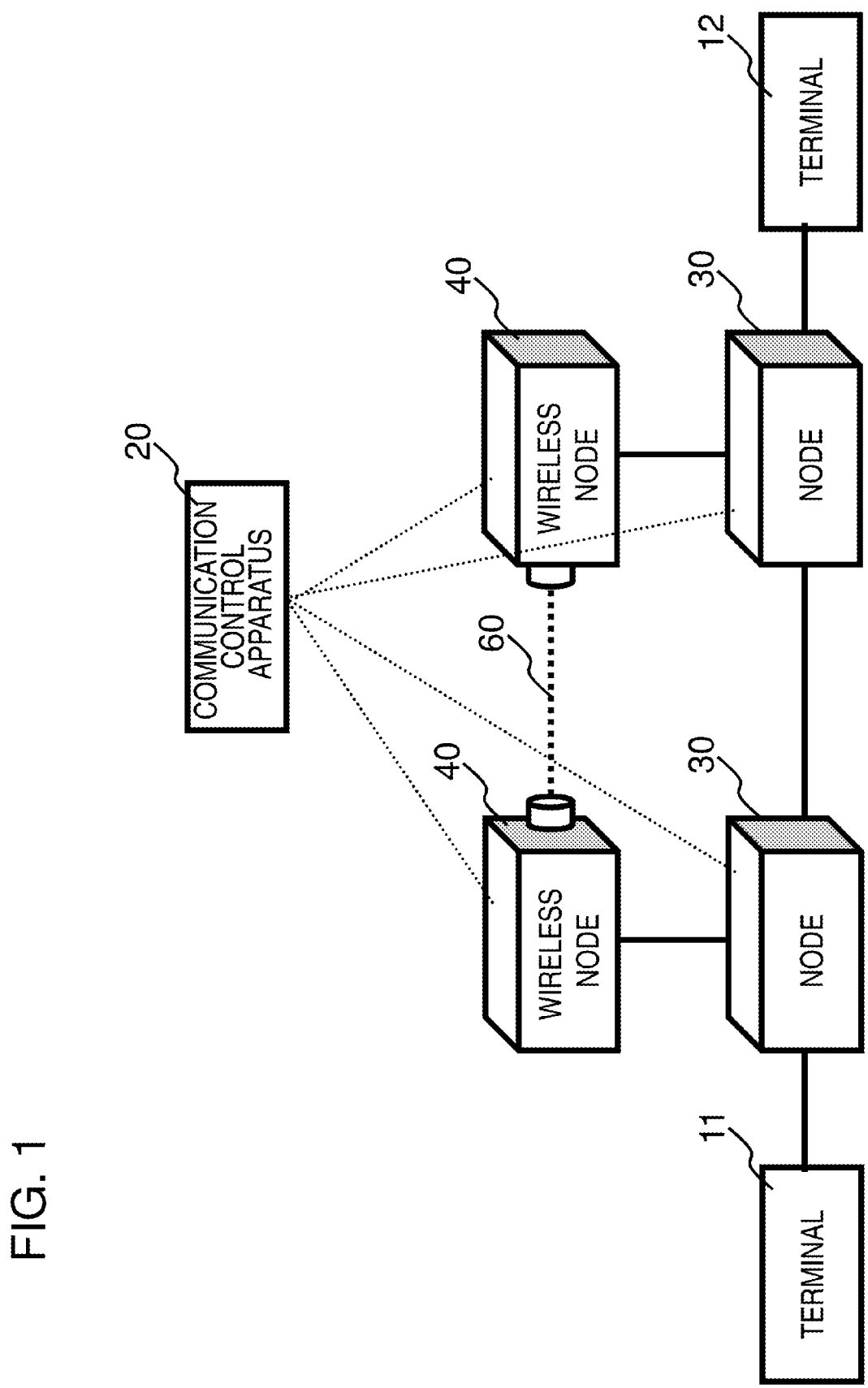
FIG. 1 is a drawing showing the configuration of a first exemplary embodiment of the present disclosure.

First, a summary of an exemplary embodiment will be given with reference to the drawings. Note that drawing reference signs in the summary are given to each element as an example solely to facilitate understanding for convenience, and are not intended to limit the present disclosure to the modes shown in the drawings.

The present disclosure in an exemplary embodiment thereof can be realized by a configuration that includes terminals (11 and 12 in FIG. 1) and a communication control apparatus (20 in FIG. 1) that establishes a communication path between these terminals (11 and 12 in FIG. 1).

More concretely, the communication control apparatus (20 in FIG. 1) notifies at least one of the terminals of information about the established communication path. Then, the terminal that has received the notification establishes a communication protocol to be used for communication between the terminals on the basis of the information from the communication control apparatus.

For instance, the communication control apparatus (20 in FIG. 1) notifies at least one of the terminals whether or not the communication path between the terminals (11 and 12 in FIG. 1) includes a link between wireless nodes 40 as the information about the established communication path. When the communication path between the terminals (11 and 12 in FIG. 1) includes a link between wireless nodes (40 in FIG. 1), the terminal adjusts the settings of the communication protocol so that it is suitable to a wireless link. On the other hand, when the communication path between the terminals (11 and 12 in FIG. 1) does not include a link between wireless nodes (40 in FIG. 1), the terminal adjusts the settings of the communication protocol so that it is suitable to a wired link. Examples of communication protocols suitable to a wireless link 60 include WTCP (Wireless Transmission Control Protocol), and a transport protocol for optical space communication (protocol over a transport layer).

According to the configuration above, it becomes possible to eliminate a mismatch between a communication path and a communication protocol, and achieve efficient communication when the communication path includes a wireless link.

Exemplary Embodiment 1

Next, a first exemplary embodiment of the present disclosure will be described in detail with reference to the drawings. FIG. 1 is a drawing showing the configuration of the first exemplary embodiment of the present disclosure. FIG. 1 shows a network configured to include nodes 30 and the wireless nodes 40, the terminals 11 and 12 that perform communication via this network, and the communication control apparatus 20 that controls a forwarding path for a packet exchanged between the terminals 11 and 12 by controlling the nodes 30 and the wireless nodes 40.

Each of the terminals 11 and 12 is an information processing apparatus connected to a node 30 and forwards data via TCP/IP communication. Note that the description below assumes that the terminal 11 is a terminal on the transmitting end and the terminal 12 is a terminal on the receiving end, however, they may be configured identically to be able to send and receive data.

The communication control apparatus 20 is an apparatus that determines a path between the terminals 11 and 12 from the situation of the line resources of the network once detecting that the terminal on the transmitting end has issued a communication start request. Further, the communication control apparatus 20 notifies the terminal 11, the transmission source of the communication start request, of configuration information of the determined path. Further, the communication control apparatus 20 comprises a function of managing a network topology constituted by the nodes 30 and the wireless nodes 40 and including the usage of a wireless line between the wireless nodes 40. As the communication control apparatus 20, for instance, an OpenFlow controller in a centralized control type architecture called OpenFlow can be used.

The nodes 30 and the wireless nodes 40 are communication apparatuses that forward a packet according to the control by the communication control apparatus 20. In the present exemplary embodiment, regarding data communication between the wireless nodes 40, data is forwarded between the wireless nodes 40 via the wireless link 60 wirelessly.

Figure 2:
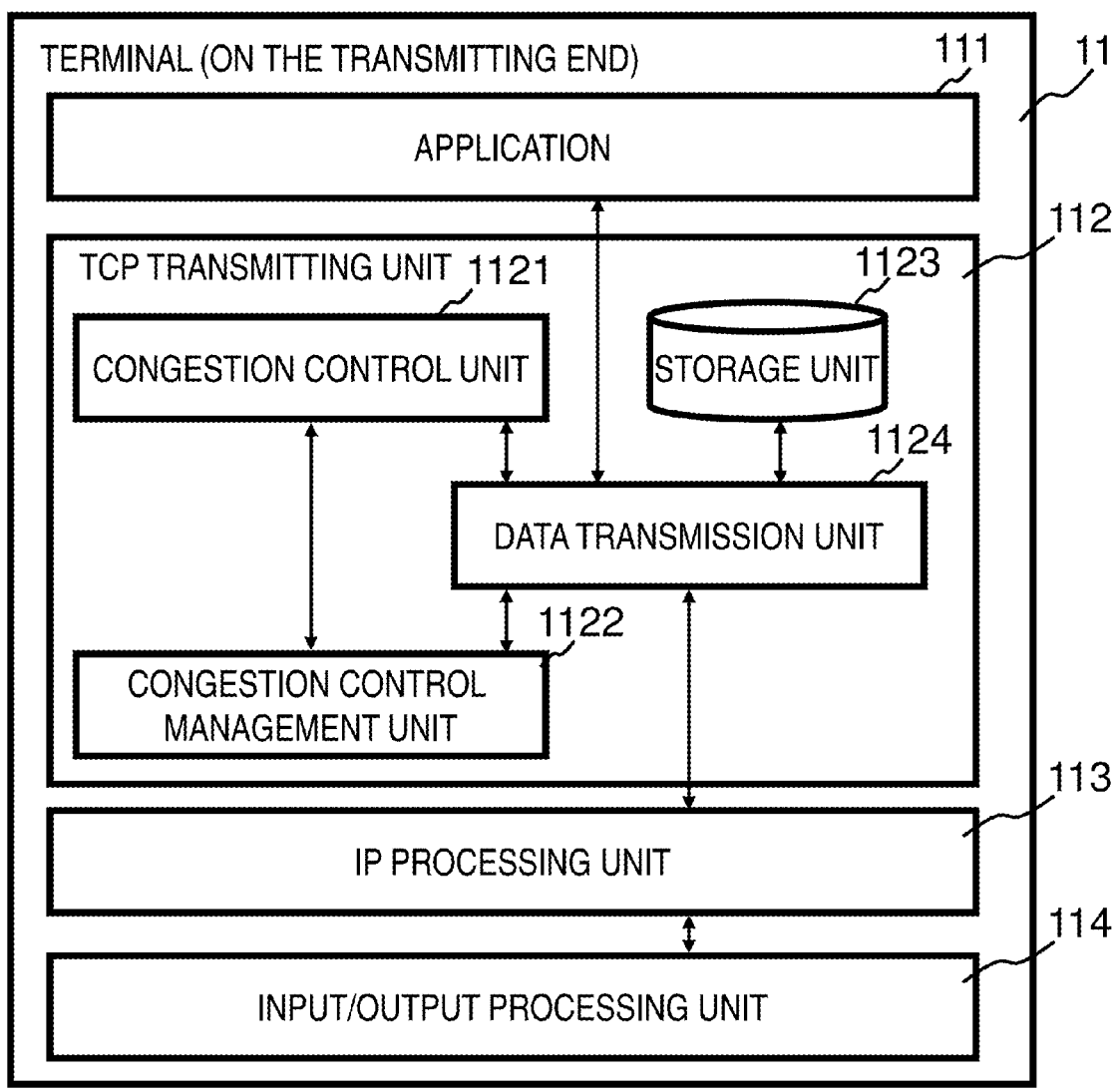
FIG. 2 is a block diagram showing the configuration of a terminal (on the transmitting end) of the first exemplary embodiment of the present disclosure.

FIG. 2 is a block diagram showing the configuration of the terminal 11 on the transmitting end. FIG. 2 shows a configuration that comprises an application program (simply referred to as "application" hereinafter) 111 executed by a CPU provided in the terminal 11, a TCP transmitting unit 112, an IP processing unit 113, and an input/output processing unit 114.

The application 111 outputs data resulted from predetermined processing to the TCP transmitting unit 112, and requests transmission to the terminal 12.

The TCP transmitting unit 112 segments the data received from the application 111 and outputs the results to the IP processing unit 113. In the present exemplary embodiment, the TCP transmitting unit 112 is constituted by including a congestion control unit 1121 that adjusts the communication throughput by determining a congestion window size (the amount of a transmittable segment) on the basis of configuration information of a path from the communication control apparatus 20, a congestion control management unit 1122 that determines a congestion control algorithm requested for use at the start of communication and stores it in an option area header (refer to FIG. 6) of a TCP header of a communication start request message (SYN), a storage unit 1123 that stores data, and a data transmitting unit 1124 that transmits a segment.

The IP processing unit 113 packetizes the segment received from the TCP transmitting unit 112, and outputs the packet to the input/output processing unit 114.

The input packet processing unit 114 sends the packet received from the IP processing unit 113 to the network.

Figure 3:
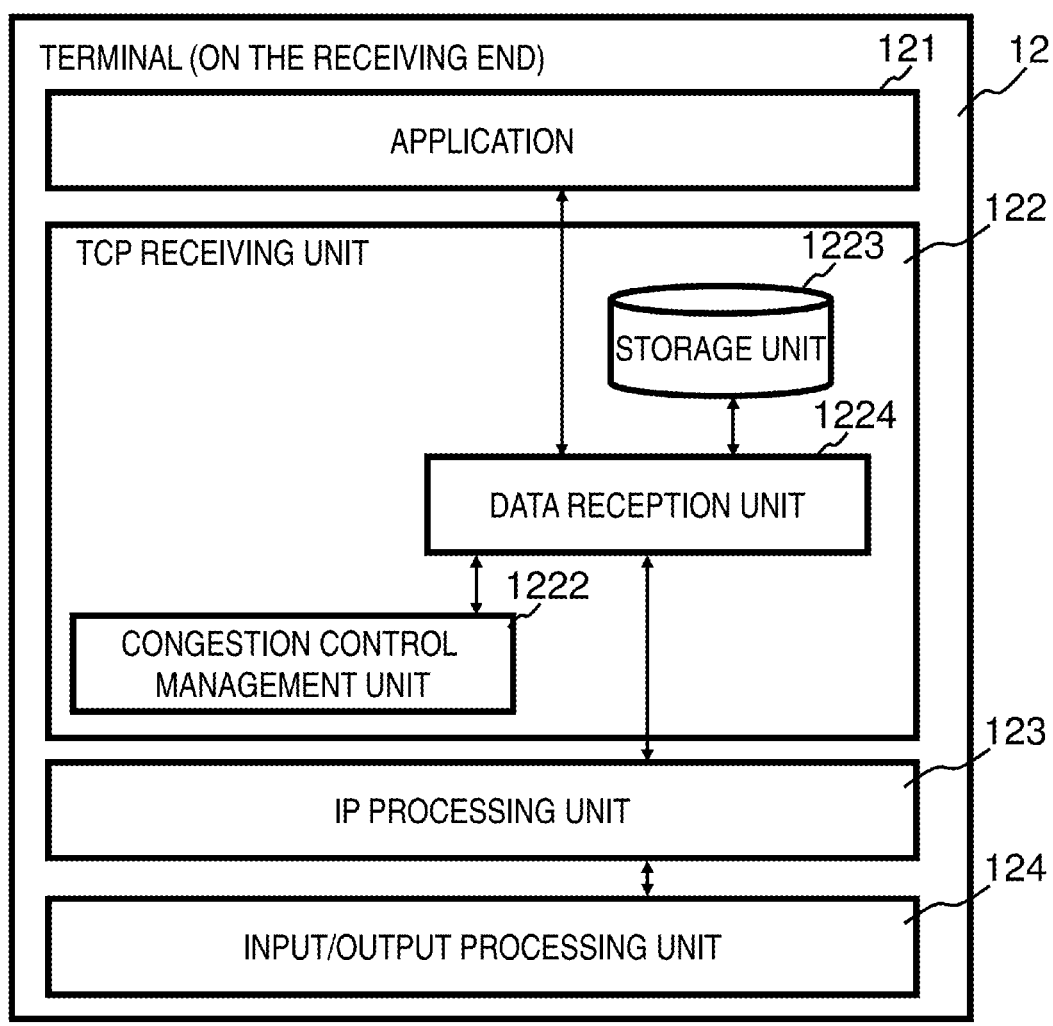
FIG. 3 is a block diagram showing the configuration of a terminal (on the receiving end) of the first exemplary embodiment of the present disclosure.

FIG. 3 is a block diagram showing the configuration of the terminal 12 on the receiving end. FIG. 3 shows a configuration that comprises an application 121 executed by a CPU provided in the terminal 12, a TCP receiving unit 122, an IP processing unit 123, and an input/output processing unit 124.

The application 121 receives data from the TCP receiving unit 122 and performs predetermined processing.

The TCP receiving unit 122 converts a packet received from the IP processing unit 123 into data and outputs the data to the application 121. In the present exemplary embodiment, TCP receiving unit 122 is constituted by including a congestion control management unit 1222 that refers to a congestion control algorithm stored in a communication start request at the start of communication, determines a usable congestion control algorithm, and stores the algorithm in an option area header (refer to FIG. 6) of a TCP header, a storage unit 1223 that stores a segment, and a data reception unit 1224 that receives a segment.

The IP processing unit 123 outputs a packet received from the input/output processing unit 124 to the TCP receiving unit 122.

The input/output processing unit 124 outputs a packet received from the network to the IP processing unit 123.

The terminals 11 and 12 described above can be realized by configurations in which the congestion control unit 1121 and the congestion control management units 1122 (1222) are added to apparatuses having general TCP/IP communication functions.

Figure 4:
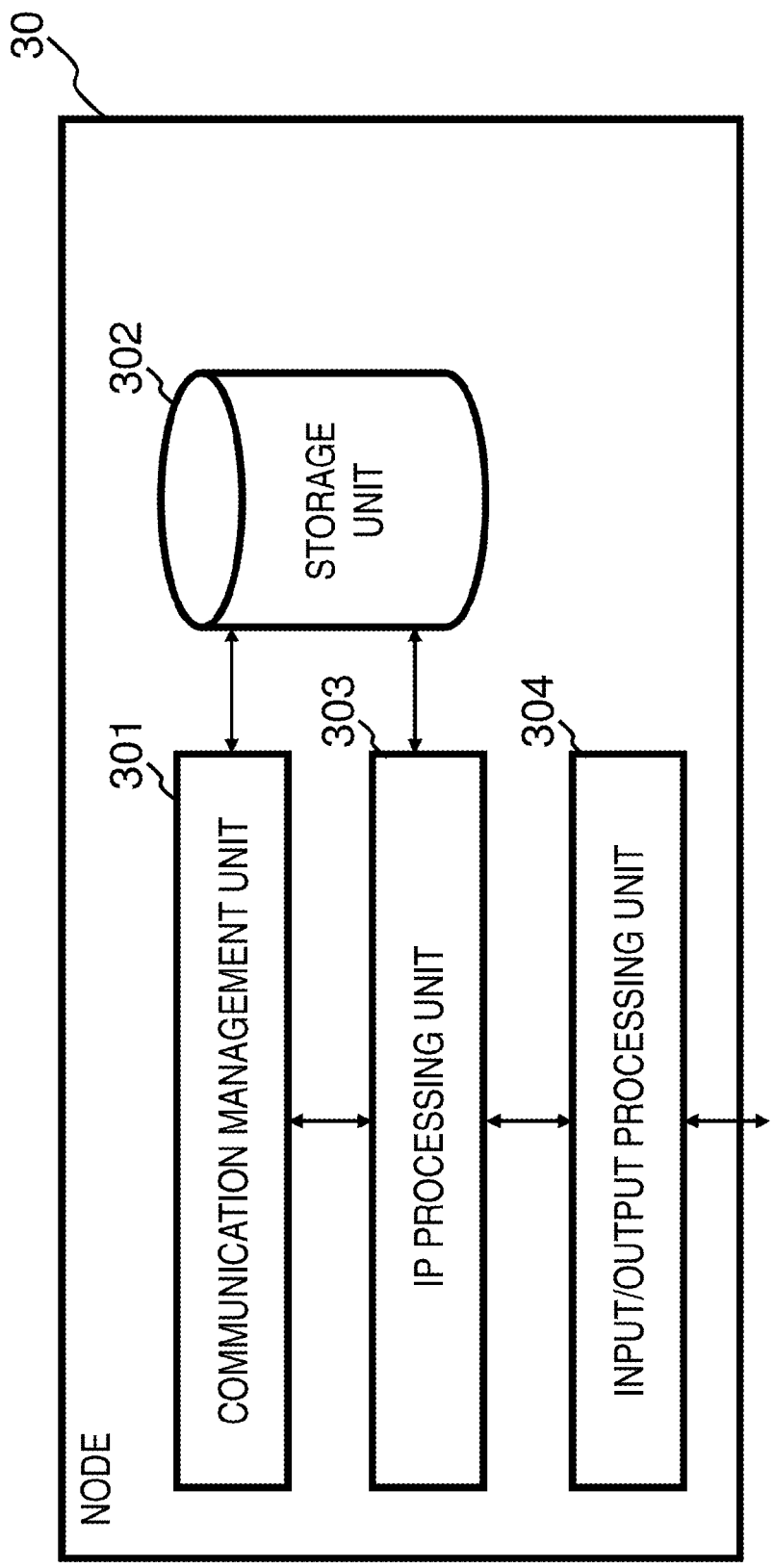
FIG. 4 is a block diagram showing the configuration of a node of the first exemplary embodiment of the present disclosure.

FIG. 4 is a block diagram showing the configuration of the node 30. FIG. 4 shows a configuration that comprises a communication management unit 301, a storage unit 302, an IP processing unit 303, and an input/output processing unit 304.

The input/output processing unit 304 outputs a packet from the network to the IP processing unit 303. Further, the input/output processing unit 304 outputs a packet from the IP processing unit 303 to the network.

The IP processing unit 303 compares the header of a packet supplied by the input/output processing unit 304 with control information stored in the storage unit 302, and when there is control information that defines the processing contents for a packet having this header such as the forwarding destination, the IP processing unit 303 forwards the packet according to the control information. On the other hand, when there is no control information that defines the processing contents for a packet having this header such as the forwarding destination or when the received packet is a path setting packet storing control information from the communication control apparatus 20, the IP processing unit 303 outputs the packet to the communication management unit 301.

The communication management unit 301 adds a new header setting the communication control apparatus 20 as the destination to the packet supplied by the IP processing unit 303, encapsulates the packet, outputs it to the IP processing unit 303, and requests the communication control apparatus 20 to determine a path and transmit control information. Further, the communication management unit 301 extracts control information from a response packet (path setting packet) sent by the communication control apparatus 20 in response to the request, and registers the control information in the storage unit 302. Further, the communication management unit 301 notifies the terminal 11 of path configuration information received from the communication control apparatus 20.

Figure 5:
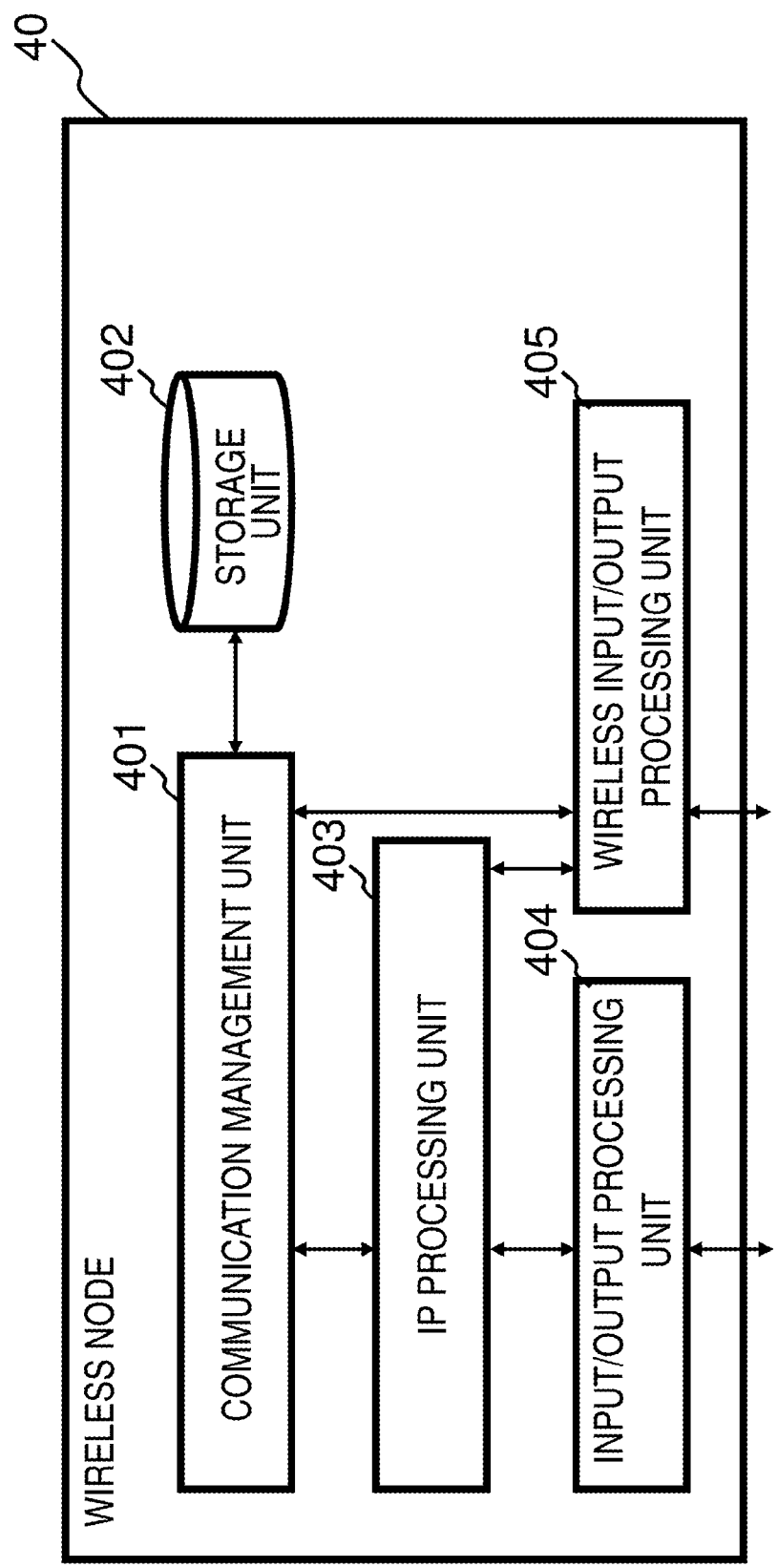
FIG. 5 is a block diagram showing the configuration of a wireless node of the first exemplary embodiment of the present disclosure.

FIG. 5 is a block diagram showing the configuration of the wireless node 40. FIG. 5 shows a configuration that comprises a communication management unit 401, a storage unit 402, an IP processing unit 403, an input/output processing unit 404, and a wireless input/output processing unit 405.

The wireless node 40 is configured identically to the node 30 except that the wireless input/output processing unit 405 that establishes the wireless link 60 according to an instruction of the communication management unit 401 and exchanges a packet with a facing wireless node 40 is added thereto. Further, the communication management unit 401 of the present exemplary embodiment returns the usage of the wireless line in response to an inquiry about the usage of the wireless line from the communication control apparatus 20. More concretely, the wireless node 40 responds to the communication control apparatus 20 that the wireless line is being used when packet forwarding via the wireless link 60 is performed and responds that the wireless line is not being used otherwise. Instead of the usage of the wireless line, wireless resources or the usage of an antenna may be confirmed.

Further, each function block (processing means) of each apparatus shown in FIGS. 2 to 5 can be realized by a computer program that has a computer constituting these apparatuses execute each processing described above using the hardware thereof.

Figure 7:
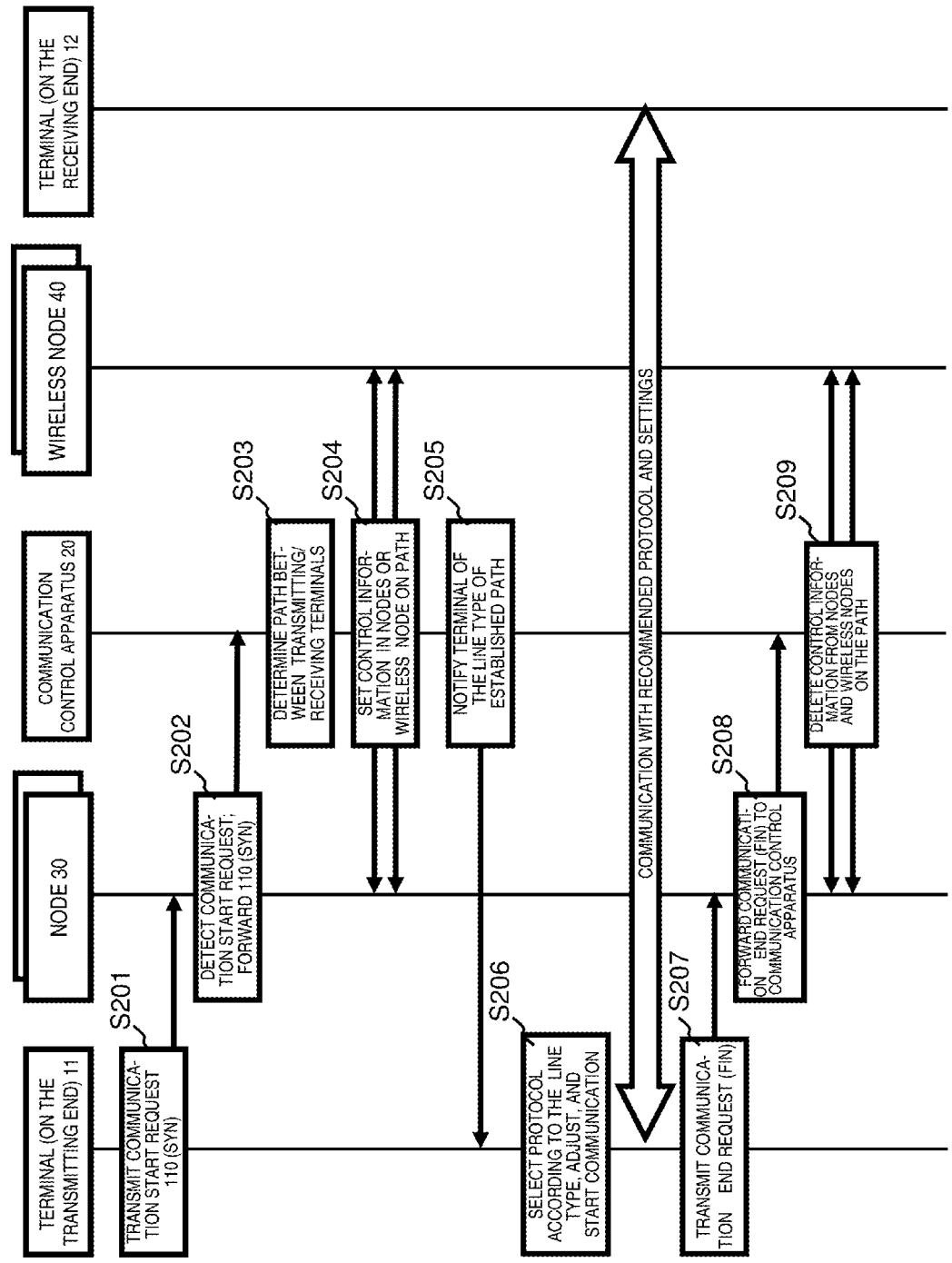
FIG. 7 is a sequence diagram showing the operation of the first exemplary embodiment of the present disclosure.

Next, the operation of the present exemplary embodiment will be described in detail with reference to the drawings. FIG. 7 is a sequence diagram showing the operation of the first exemplary embodiment of the present disclosure. In FIG. 7, first the terminal 11 on the transmitting end transmits a communication start request message (SYN) to the network (S201 in FIG. 7). This communication start request stores at least the address of the receiving terminal therein. The communication start request message of the present exemplary embodiment further stores a congestion control algorithm, retransmission control algorithm, etc. in an option area of a TCP/IP header.

FIG. 6 shows an example of information stored in the option area of the TCP header. In the example in FIG. 6, a congestion control algorithm, retransmission control algorithm, retransmission control option, window size, line bandwidth, and transfer data size used for communication to be started can be specified.

When the communication start request message reaches the node 30, the node 30 forwards the communication start request message to the communication control apparatus 20 as a specified operation when the storage unit 302 does not have control information for processing the communication start request message or according to control information that instructs the communication start request message to be transmitted to the communication control apparatus 20 (S202 in FIG. 7). The node 30 may forward the communication start request message to the communication control apparatus 20 when the node 30 is able to confirm that a SYM flag in the TCP header of the communication start request message is 1 by referring thereto.

Next, the communication control apparatus 20 refers to the contents of the communication start request message and determines a path between the terminal 11 on the transmitting end and the terminal 12 on the receiving end (S203 in FIG. 7). For instance, in the case of the network in FIG. 1, a path going through the terminal 11 on the transmitting end, the node 30 (on the left), the node 30 (on the right), and the terminal 12 on the receiving end, and a path going through the terminal 11 on the transmitting end, the node 30 (on the left), the wireless node 40 (on the left), the wireless node 40 (on the right), the node 30 (on the right), and the terminal 12 on the receiving end are possible. The communication control apparatus 20 selects a path that makes the bandwidth between the terminals 11 and 12 larger from these paths. Further, in the path selection, the communication control apparatus 20 can take into consideration the results of asking the wireless node 40 whether or not the wireless line is being used. Moreover, the communication control apparatus 20 may determine a path while taking the requested line bandwidth or the transfer data size included in the communication start request message into account.

Next, the communication control apparatus 20 sets control information that forwards a packet between the terminals 11 and 12 along the determined path in the nodes 30 or the wireless nodes 40 on the determined path (S204 in FIG. 7). The description below assumes that a path including the wireless line is selected in S203 in FIG. 7. In this case, the communication control apparatus 20 sets control information in each of the nodes 30 and the wireless nodes 40 so that a packet from the terminal 11 to the terminal 12 is forwarded in this order: the terminal 11 on the transmitting end, the node 30 (on the left), the wireless node 40 (on the left), the wireless node 40 (on the right), the node 30 (on the right), and the terminal 12 on the receiving end.

Further, since the communication path includes the wireless link 60, the communication control apparatus 20 notifies the terminal 11 on the transmitting end of that fact via the node 30 (S205 in FIG. 7). Further, the notification may include a congestion control algorithm recommended by a transport protocol (refer to FIG. 6).

The terminal 11 on the transmitting end retransmits a communication start request message setting a congestion control algorithm, retransmission control algorithm, retransmission control option, window size, line bandwidth, and transfer data size on the basis of the notification (S206 in FIG. 7).

The node 30 (on the left) forwards the communication start request message to the wireless node 40 (on the left) according to the control information set by the communication control apparatus 20. Similarly, the communication start request message is forwarded in the order of the wireless node 40 (on the right), the node 30 (on the right), and the terminal 12 on the receiving end.

Having received the communication start request message, the terminal 12 on the receiving end sets the recommended information stored in the option area of the communication start request message so that it is used for the communication with the terminal 11. After the setting is completed, the terminal 12 on the receiving end transmits a response message to the terminal 11 on the transmitting end in response to the communication start request. At this time, the terminal 12 on the receiving end stores the set contents in an option area of the response message. Having received the response message, the terminal 11 on the transmitting end sets the recommended information stored in the option area of the response message so that it is used for the communication with the terminal 12. The setting of the communication between the terminals 11 and 12 is completed as described, and the communication is started.

Then, after the communication is ended, for instance, the terminal 11 on the transmitting end transmits a communication end request message (FIN) to the terminal 12 (S207 in FIG. 7).

Having received the communication end request message, the node 30 forwards the communication end request message to the communication control apparatus 20 as a specified operation when the storage unit 302 does not have control information for processing the communication end request message or according to control information that instructs the communication end request message to be transmitted to the communication control apparatus 20 (S208 in FIG. 7).

Having received the communication end request message from both or one of the terminals 11 and 12, the communication control apparatus 20 determines that the communication between the terminals 11 and 12 has ended and deletes the control information set to forward a packet between the terminals 11 and 12.

As described, each time new communication starts and the communication control apparatus 20 establishes a communication path, recommended setting information according to the properties of the communication path is exchanged. For instance, after S206 in FIG. 7, each time new communication (which may be communication by another application between the terminals 11 and 12) starts while the terminals 11 and 12 are still communicating with each other, the communication control apparatus 20 establishes a communication path and recommended setting information according to the properties of the communication path is exchanged.

As described, according to the present exemplary embodiment, even when a network is constituted by a plurality of line types and there are large differences in the achieved communication performance depending on the network protocol used, it is possible to select an appropriate network protocol according to the path configuration. Particularly, in a case where a high-cost but high-speed line such as an optical space link is included in the network, the utilization of these lines can be improved and high-level communication functionality can be provided to the terminals.

The exemplary embodiment of the present invention has been described, however, the present invention is not limited to the exemplary embodiment and further modifications, substitutions, and adjustments can be performed within the scope of the basic technological concept of the present invention. For instance, the network configuration and the numbers of the nodes, the wireless nodes, and the terminals used in the exemplary embodiment above are merely examples and these numbers are not restricted.

Further, in the exemplary embodiment above, the terminals 11 and 12 exchange the recommended setting information using the option area of the TCP header, however, the method is not limited thereto and for instance, the recommended setting information may be exchanged by adding an additional header.

Further, in the exemplary embodiment described above, a congestion control algorithm, retransmission control algorithm, retransmission control option, window size, line bandwidth, and transfer data size can be specified, however, a configuration in which protocols such as TCP, WTCP, and an optical space communication protocol can be changed may be employed in a case where each of the terminals 11 and 12 supports a corresponding protocol.

Further, in the exemplary embodiment described above, the recommended settings are changed depending on whether or not a wireless line is included in the path, however, when there are a plurality of types of wired lines having different performance abilities or there are a plurality of types of wireless lines having different performance abilities, the recommended settings and the protocols may be changed according to the properties of these lines.

Further, in the exemplary embodiment described above, the communication control apparatus transmits the information as to whether or not the wireless link 60 is included in the communication path and the recommended setting information to the terminals 11 and 12, however, information about the packet loss rate of the communication path between the terminals may be notified and the terminals 11 and 12 may set a protocol according to the packet loss rate. For instance, with a high packet loss rate, the terminals 11 and 12 select a communication protocol expecting packet loss or change the control parameters of the retransmission timer.

Finally preferred modes of the present invention will be summarized.

[Mode 1]
(Refer to the communication system according to the first aspect.)

[Mode 2]
In the communication system of Mode 1,
the communication protocol to be established is a transport protocol.

[Mode 3]
In the communication system of Mode 2,
any of the terminals sets the transport protocol each time the communication control apparatus establishes a communication path.

[Mode 4]
In the communication system of any one of Modes 1 to 3,
the communication control apparatus establishes a path between the terminals when detecting a communication start request between the terminals.

[Mode 5]
In the communication system of any one of Modes 1 to 4,
the communication control apparatus comprises means for confirming whether or not a communication line between the terminals is available and determines a communication path between the terminals on the basis of the confirmation results.

[Mode 6]
In the communication system of any one of Modes 1 to 5,
the communication control apparatus notifies at least one of the terminals whether or not the communication path between the terminals includes a wireless link, and
the terminal that has received the notification establishes a communication protocol to be used for communication between the terminals for a wireless link on the basis of information from the communication control apparatus.

[Mode 7]
In the communication system of any one of Modes 1 to 6,
the communication control apparatus notifies at least one of the terminals of information about a packet loss rate of a communication path between the terminals, and
the terminal that has received the notification establishes a communication protocol used for communication between the terminals on the basis of the packet loss information from the communication control apparatus.

[Mode 8]
In the communication system of any one of Modes 1 to 7,
the means for confirming whether or not a communication line between the terminals is available confirms the usage of wireless resources or an antenna.

[Mode 9]
In the communication system of any one of Modes 1 to 8,
the communication control apparatus deletes the settings of the established communication path when receiving a notification that communication has ended from any of the terminals.

[Mode 10]
(Refer to the terminal according to the second aspect.)

[Mode 11]

(Refer to the communication control apparatus according to the third aspect.)
[Mode 12]
(Refer to the communication method according to the fourth aspect.)
[Mode 13]
(Refer to the program according to the fifth aspect.)

Further, the disclosure of each Patent Literature and Non-Patent Literature cited above is incorporated herein in its entirety by reference thereto. It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modifications. Particularly, the ranges of the numerical values used in the present description should be interpreted as a specific numeric value or small range included in the ranges even in cases where it is not stated so.

REFERENCE SIGNS LIST 11, 12: terminal
20: communication control apparatus
30: node
40: wireless node
60: wireless link
111, 121: application program (application)
112: TCP transmitting unit
113, 123, 303, 403: IP processing unit
114, 124, 304, 404: input/output processing unit
122: TCP receiving unit
301, 401: communication management unit
302, 402: storage unit
405: wireless input/output processing unit
1121: congestion control unit
1122, 1222: congestion control management unit
1123, 1223: storage unit
1124: data transmission unit
1224: data reception unit

The invention claimed is:

1. A communication system, comprising:
a communication control apparatus that establishes a communication path between terminals and notifies at least one of the terminals of information about the established communication path,
wherein the terminal that has received the notification from the communication control apparatus establishes a communication protocol to be used for communication between the terminals based on the information from the communication control apparatus, wherein the communication control apparatus comprises a unit that notifies the at least one of the terminals whether or not the communication path between the terminals includes a wireless link,
wherein the terminal comprises a unit that establishes the communication protocol to be used for communication between the terminals for the wireless link based on information from the communication control apparatus when the terminal receives the notifications,
wherein the communication control apparatus further comprises a unit that notifies at least one of the terminals of information about a packet loss rate of the communication path between the terminals, and
wherein the terminal comprises a unit that adjusts settings of the communication protocol used for communication between the terminals according to the packet loss rate and based on the information from the communication control apparatus.

2. The communication system according to claim 1, wherein the communication protocol to be established comprises a transport protocol.

3. The communication system according to claim 2, wherein any of the terminals sets the transport protocol each time the communication control apparatus establishes the communication path.

4. The communication system according to claim 1, wherein the communication control apparatus establishes a path between the terminals when detecting a communication start request between the terminals.

5. The communication system according to claim 1, wherein the communication control apparatus further comprises a unit that deletes settings of the established communication path when receiving a notification that communication has ended from any of the terminals.

6. The communication system according to claim 1, wherein the communication protocol comprises a Transmission Control Protocol (TCP), and
wherein the notification of the information by the communication control apparatus is triggered by a communication start request message (SYN) of the TCP.

7. The communication system according to claim 1, wherein the communication protocol comprises a Transmission Control Protocol (TCP), and
wherein the information notified by the communication control apparatus includes at least one of:
a congestion control algorithm;
a retransmission control algorithm;
a retransmission control option;
a window size;
a line bandwidth; and
a transfer data size.

* * * * *